United States Patent
Kemmerer

[15] 3,690,181
[45] Sept. 12, 1972

[54] SEGMENT RANGE ADJUSTMENT CLAMP

[72] Inventor: Kenneth C. Kemmerer, Quakertown, Pa.

[73] Assignee: Ametek, Inc., New York, N.Y.

[22] Filed: June 26, 1970

[21] Appl. No.: 50,183

[52] U.S. Cl. ................................................ 73/418
[51] Int. Cl. ........................................... G01l 7/04
[58] Field of Search ............... 73/411, 418; 269/203; 24/243 B

[56] References Cited

UNITED STATES PATENTS

| | | |
|---|---|---|
| 647,164 | 4/1900 | Staff ............................ 73/411 |
| 1,002,877 | 9/1911 | Shebol et al. ................. 73/411 |
| 3,154,949 | 11/1964 | Smith et al. ............ 73/418 UX |
| 1,206,849 | 12/1916 | Howe ........................ 73/411 X |
| 2,084,926 | 6/1937 | Tinnerman ............... 24/243 B |
| 2,144,140 | 1/1939 | Batcheller ................ 24/243 B |

Primary Examiner—Louis R. Prince
Assistant Examiner—Daniel M. Yasich
Attorney—Smythe & Moore

[57] ABSTRACT

The slotted tail portion of a sector gear has slideably mounted thereon a substantially U-shaped clamp with one end of the clamp having a bent lip so that the clamp has a cross-section substantially conforming to the cross-section of the tail member. A screw passes through an opening in one leg portion of the clamp, through the slot and is threaded into an opening in the other leg portion. The screw may pass through a link and can be loosened with respect to the clamp to permit positioning of the clamp along the slotted tail portion without separating the screw from the clamp.

1 Claim, 7 Drawing Figures

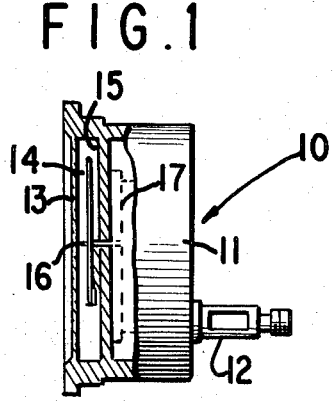
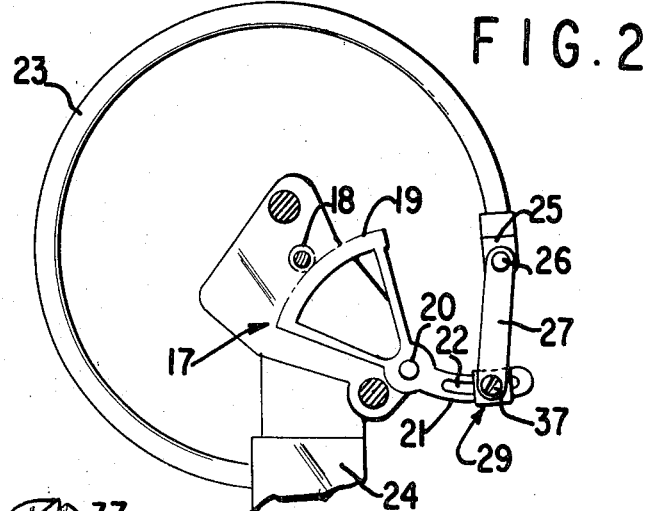
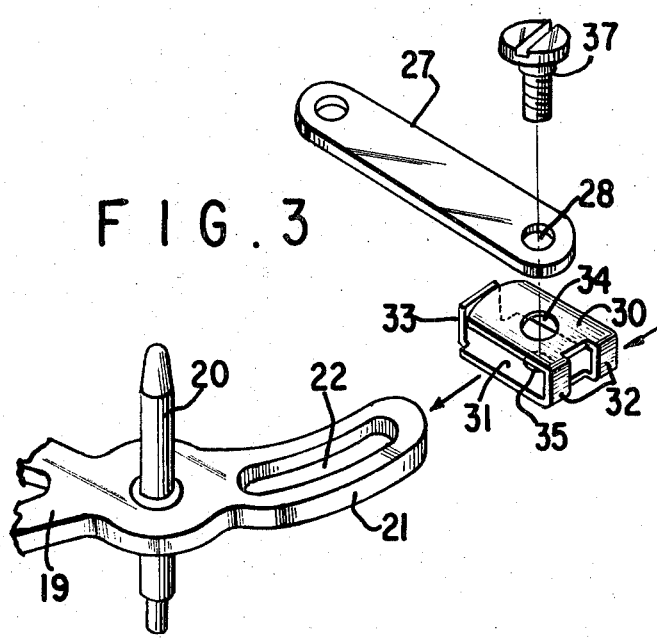
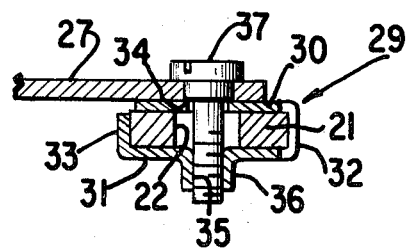
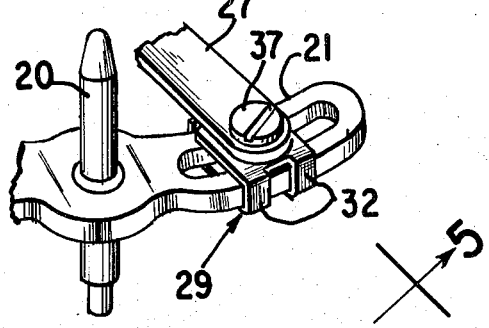
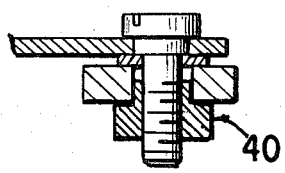
FIG. 1
FIG. 2
FIG. 3
FIG. 4
FIG. 5
PRIOR ART
FIG. 6  FIG. 7
INVENTOR
KENNETH C. KEMMERER
BY Smythe & Moore
ATTORNEYS

SEGMENT RANGE ADJUSTMENT CLAMP

In gauges of the Bourdon tube type, the gauge movement generally includes a pivotally mounted sector gear with an arcuate tail portion having a slot therein. The tail portion is connected by a link to the free or movable end of the Bourdon tube. The free end of the Bourdon tube moves in an arcuate path in response to pressure variations acting within the interior of the tube. The angle through which the sector gear pivots in response to movements of the Bourdon tube is determined by the connection between the link and the sector gear tail portion. By varying the distance from the pivot axis to the connection of the link with the tail portion, different angles of movement for the sector gear will be obtained for the same movement of the Bourdon tube. Adjusting this connection between the link and the sector gear tail portion provides for the calibration of the gauge and also for the use of different graduated scales to indicate different ranges of pressure.

Many forms of adjustable connections have been proposed between the link and the sector gear tail portion. Such connections invariably have the disadvantage that they were too complicated and could not be simply manipulated when it was desired to change the connection.

One of the objects of the present invention is to provide an improved adjustment clamp for connecting the link of a Bourdon tube gauge to the tail portion of sector gear.

Another of the objects of the present invention is to provide such an adjustment clamp which need not be removed but merely loosened in order to adjust the connection on the tail portion.

According to one aspect of the present invention, a pressure gauge having a pressure responsive element with a movable part is provided with a pivotally mounted sector gear which constitutes a part of the gauge movement. The sector gear has a tail portion with a slot, preferably arcuate, therein. A link has one end connected to the movable part of the pressure responsive element, and the other end is adjustably connected to the sector gear tail portion arcuate slot by means of the adjustment clamp according to the present invention. The adjustment clamp is positioned on both slotted faces of the tail portion and a detachable fastener element interconnects these two portions of the clamp by passing through the arcuate slot. It is only necessary to loosen this fastener element in order to adjust the position of the clamp upon the tail portion.

Other objects, advantages and features of the present invention will be apparent from the accompanying description and drawings, which are merely exemplary.

In the drawings:

FIG. 1 is a side elevational view of a gauge incorporating the present invention with a portion of the casing being removed;

FIG. 2 is a plan view of the Bourdon tube employed as a pressure responsive element in the gauge of FIG. 1;

FIG. 3 is a perspective view of the sector gear tail portion, link, and adjustment clamp and fastener element according to the present invention;

FIG. 4 is a view similar to that of FIG. 3 but showing the clamp in position whereby the link is connected to the sector gear tail portion;

FIG. 5 is a sectional view taken along the line 5—5 of FIG. 4;

FIG. 6 is a view similar to that of FIG. 5 but showing an adjustment clamp according to the prior art; and FIG. 7 is a perspective view of the nut of FIG. 6.

Proceeding next to the drawings wherein like reference symbols indicate the same parts throughout the various views, a specific embodiment of the present invention will be described in detail.

As may be seen in FIG. 1, a pressure gauge incorporating the present invention is indicated generally at 10 which comprises case 11 and a connection 12 extending from the rear of the case for connection to the pressure which is to be sensed. The front of the case 11 is closed by a transparent viewing window 13 through which may be seen indicator pointer 14 moving over dial face 15. The pointer is connected through a spindle or shaft 16 to gauge movement 17 which includes a pinion gear 18 meshing with a sector gear 19 pivotally mounted on a spindle 20. The sector gear is provided with an arcuate tail portion 21 in which is formed an arcuate slot 22.

A Bourdon tube pressure responsive element 23 has one end fixed in a support or bracket 24 which is also connected in a known manner to the pressure connection 12. The other end of the Bourdon tube, indicated at 25, is pivotally connected at 26 to a link 27 which has an opening 28 which is to be connected to the sector gear.

In order to adjustably connect the link 27 to the sector gear tail portion according to the present invention, a unitary link clamp 29 is provided which is essentially U-shaped and has leg portions 30 and 31 interconnected at 32 against an edge of tail 21. At the end of leg portion 31 is provided an upwardly bent lip or tab 33 which is positioned against an opposite edge of the tail portion 21 as may be seen in FIG 5. In this manner the legs 30 and 31 are resiliently positioned and are free to move with respect to each other to provide a clamping effect.

The leg portion 30 is provided with an opening 34 which is opposed from a threaded opening 35 formed in an extrusion 36 in leg portion 31.

A screw 37 is passed through link opening 28, opening 34, through the slot 22 to have its end threaded in the extruded opening 36 as shown in FIG. 5.

When the adjustment clamp is in position as shown in FIG. 4 it may be moved to a new position by loosening the screw 37 from its threaded connection 36 to such an extent that the link nut 29 is free to slide upon the tail portion 21 but the screw 37 is not separated from the link nut. When the clamp is moved to its new position, it is merely necessary to tighten the screw 37 and the link nut will be retained in its new position upon the tail portion of the sector gear.

In the present invention, the leg portions 30, 31 extend across the entire width of the tail portion 21 as compared with the smaller clamping area 41 used in the prior art such as seen in FIGS. 6, 7. The nut 40 of the prior art was so arranged that the link could not be moved as far in the slot as is the clamp of the present invention because body 42 would strike the ends of the slot.

It should be apparent that the present invention provides a simple but effective adjustment clamp particularly adapted for connecting the free end of a Bourdon tube by means of a link to the tail portion of a sector gear. The adjustment clamp need not be disassembled in order to be repositioned and thus eliminates the disadvantages of prior known clamps employing washers and separable elements. The clamp is simpler, has a greater clamping area, and will provide a larger adjustment than prior devices.

It will be understood that various details of construction and arrangement of parts may be made without departing from the spirit of the invention except as defined in the appended claims.

What is claimed is:

1. In a pressure gauge having a pressure responsive element with a movable part, a pivotally mounted sector gear and constituting a part of the gauge movement, said sector gear having a tail portion with a slot therein, a link having one end connected to the movable part of the pressure responsive element, and a single U-shaped resilient clamp means adjustably connecting the other end of said link to said sector gear tail portion, said U-shaped clamp means having both leg portions thereof positioned on opposed slotted faces of said tail portion, one of said leg portions having an opening therethrough and the other of said leg portions having a threaded opening opposed from the first opening, a bent lip on the end of one of said leg portions positioned adjacent an edge of said tail portion, and screw means passing through said link, said first opening and said slot and threaded into said threaded opening for adjustably connecting said clamp and said link to the tail portion of said sector gear.

* * * * *